US012523599B2

(12) United States Patent
Monpeurt et al.

(10) Patent No.: US 12,523,599 B2
(45) Date of Patent: Jan. 13, 2026

(54) DEVICE FOR DISTRIBUTING LIGHT BASED ON DIFFRACTION GRATINGS

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Salim Boutami, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 533 days.

(21) Appl. No.: 17/999,890

(22) PCT Filed: May 27, 2021

(86) PCT No.: PCT/FR2021/050964
§ 371 (c)(1),
(2) Date: Nov. 25, 2022

(87) PCT Pub. No.: WO2021/240115
PCT Pub. Date: Dec. 2, 2021

(65) Prior Publication Data
US 2023/0221245 A1   Jul. 13, 2023

(30) Foreign Application Priority Data

May 28, 2020 (FR) ..................... 20 05656

(51) Int. Cl.
*G01N 21/35* (2014.01)
*F21V 8/00* (2006.01)

(52) U.S. Cl.
CPC .......... *G01N 21/35* (2013.01); *G02B 6/0036* (2013.01); *G01N 2201/0635* (2013.01); *G01N 2201/0638* (2013.01)

(58) Field of Classification Search
CPC .... G01N 21/35; G02B 6/0036; G02B 6/0038; G02B 6/0076
See application file for complete search history.

(56) References Cited

U.S. PATENT DOCUMENTS

| 2007/0133935 A1 | 6/2007 | Fine |
| 2009/0116801 A1 | 5/2009 | Fine |

(Continued)

FOREIGN PATENT DOCUMENTS

| CN | 103064141 B | 6/2015 | |
| WO | WO 2017/039820 A1 | 3/2017 | |
| WO | WO-2018213009 A1 * | 11/2018 | ......... G02B 27/0081 |

OTHER PUBLICATIONS

International Search Report & Written Opinion issued Jul. 29, 2021 in PCT/FR2021/050964, filed on May 27, 2021, 19 pages (with English Translation).

(Continued)

*Primary Examiner* — Casey Bryant
(74) *Attorney, Agent, or Firm* — Oblon, McClelland, Maier & Neustadt, L.L.P.

(57) ABSTRACT

A light distributing device configured for, in use, distributing, over a scene to illuminate light rays that come from an auxiliary light source, and which comprises: a planar waveguide, with a core layer disposed between the two cladding layers; and an extraction set, located in the planar waveguide, and constituted by a plurality of diffraction gratings distributed in the two dimensions of a plane parallel to the plane of the planar waveguide.

13 Claims, 5 Drawing Sheets

(56) References Cited

U.S. PATENT DOCUMENTS

| | | | |
|---|---|---|---|
| 2010/0014822 A1 | 1/2010 | Fine et al. | |
| 2011/0306143 A1 | 12/2011 | Chiou et al. | |
| 2013/0114922 A1 | 5/2013 | Meir | |
| 2014/0367589 A1 | 12/2014 | Chiou et al. | |
| 2016/0084761 A1 | 3/2016 | Rothberg et al. | |
| 2016/0370291 A1 | 12/2016 | Rothberg et al. | |
| 2016/0370292 A1 | 12/2016 | Rothberg et al. | |
| 2017/0227465 A1* | 8/2017 | Hsieh ................ | G02B 6/0053 |
| 2017/0299518 A1 | 10/2017 | Rothberg et al. | |
| 2017/0322157 A1 | 11/2017 | Hsieh et al. | |
| 2018/0107158 A1* | 4/2018 | Watanabe ........... | G03H 1/0443 |
| 2018/0107159 A1 | 4/2018 | Matsuo | |
| 2018/0120229 A1 | 5/2018 | Rothberg et al. | |
| 2018/0180793 A1 | 6/2018 | Fattal | |
| 2018/0246330 A1 | 8/2018 | Fattal | |
| 2019/0094467 A1* | 3/2019 | Hassan ............... | G02B 6/305 |
| 2019/0212265 A1 | 7/2019 | Rothberg et al. | |
| 2020/0018888 A1* | 1/2020 | Lyu .................... | G02B 6/0055 |
| 2020/0088639 A1 | 3/2020 | Rothberg et al. | |
| 2020/0358528 A1* | 11/2020 | Hunt .................. | G02B 6/4287 |
| 2023/0021956 A1* | 1/2023 | Dupoy ............... | G01J 3/2823 |

OTHER PUBLICATIONS

French Preliminary Search Report issued Jan. 29, 2021 in French Application 20 05656, filed on May 28, 2020, 12 pages (with English translation of categories of cited documents 7 written opinion).

\* cited by examiner

DEVICE FOR DISTRIBUTING LIGHT BASED ON DIFFRACTION GRATINGS

TECHNICAL FIELD

The invention relates to a device for distributing light configured for, in use, receiving light rays coming from a light source and distributing those rays over a scene to illuminate.

STATE OF THE PRIOR ART

Lens-free optical imaging systems are known from the prior art, in which a sensor module acquires a wide-field image of a sample. The sample and the sensor module are placed in immediate proximity to each other, without magnifying optics between them. A light source provides the light for illuminating the sample. A light distributing device may be disposed at an exit of the light source, to collect the light of a narrow light beam emitted by the light source, and distribute that light onto an extended surface belonging to the sample. The light distributing device advantageously has a small thickness, enabling it to be accommodated in a space of thickness less than or equal to the distance that separates, in use, the sample from the sensor module.

Patent application FR1914926 describes an example of such an optical system, to carry out an analysis on a sample by infrared spectrometry. In this example, the light distributing device is constituted by a series of passive extraction structures, each coupled to a respective secondary waveguide, and incorporated with the secondary waveguides on a same substrate. The secondary waveguides are themselves coupled to a main waveguide by evanescent coupling. The passive extraction structures are each formed by a reflective surface, located at the exit of the corresponding secondary waveguide and inclined at an angle to the plane of the substrate. Each reflective surface is formed by a reflective coating deposited on an etched interface of the substrate.

Such a light distributing device has several drawbacks, in particular complex manufacture requiring the production of multiple secondary waveguides and angled facets in the substrate, and a not very even distribution of the light on the surface of the sample to illuminate.

An objective of the present invention is to provide a light distributing device suitable for being integrated into a lens-free optical imaging system for, in use, distributing, over a scene to illuminate, light rays that come from an auxiliary light source, and which does not have the drawbacks of the prior art mentioned above.

Presentation of the Invention

This objective is attained with a light distributing device configured for, in use, distributing, over a scene to illuminate, light rays coming from an auxiliary light source, and which comprises:
- a planar waveguide which comprises two cladding layers and one core layer, with two faces of greater extent of the core layer which extend parallel to a plane named plane of the planar waveguide, and with the two cladding layers and the core layer being superposed together along an axis orthogonal to the plane of the planar waveguide with the core layer disposed between the two cladding layers; and
- an extraction set, located in the planar waveguide, and constituted by a plurality of diffraction gratings distributed in the two dimensions of a plane parallel to the plane of the planar waveguide, an average value of a fill factor varying monotonically, from one diffraction grating to another of the extraction set, and along an axis parallel to the plane of the planar waveguide.

The diffraction gratings are gratings of coupling grating type, known in the field of integrated optics to form an optical coupling between an optic fiber and a waveguide that is integrated on a photonic chip. In the invention, the diffraction gratings are numerous, and distributed over a large surface within the extraction set.

The extraction set is accommodated within the planar waveguide, without increasing the thickness of the latter. The thickness of the light distributing device thus corresponds to the thickness of the planar waveguide. The light distributing device may thus have small thickness, compatible in particular with its integration in a lens-free optical imaging system such as that described in the introduction. In particular, the light distributing device according to the invention can easily have a thickness less than or equal to the distance which separates, in use, the sample and the sensor module in the lens-free optical imaging system described in the introduction. This thickness is advantageously less than or equal to 1.5 µm.

The manufacture of a light distributing device according to the invention requires the production of a single planar waveguide, within which diffraction gratings are etched. The manufacture does not require the implementation of complex processes, and has low constraints in particular in terms of alignment. The light distributing device according to the invention may thus be manufactured simply, quickly and at low cost.

In operation, the light is introduced into the light distributing device at the location of a transverse face of the latter, at the location of the core layer. The light then passes in the planar waveguide, by successive reflections at the interfaces between the core layer and each of the cladding layers. During its propagation in the planar waveguide, the light is confined only along the axis of the thickness of the planar waveguide, that is to say along an axis orthogonal to the plane of the planar waveguide. In the two other dimensions of space, the propagation in the planar waveguide is in the form of spatial spreading of the light (unless the beam introduced already has a width substantially equal to that of the planar waveguide).

The light passing in the planar waveguide is extracted therefrom by each of the diffraction gratings of the extraction set. Preferably, each diffraction grating is configured to extract light in the form of a light beam oriented along an axis orthogonal to the plane of the planar waveguide. In practice, the light is extracted in the direction of the scene to illuminate as well as in the opposite direction, but one of the directions can be favored by appropriate choices of refractive index in the media in contact with the planar waveguide.

The light propagating in the planar waveguide does not reach all the diffraction gratings simultaneously. Each diffraction grating extracts only part of the light arriving thereat in the planar waveguide, the light not extracted continuing to propagate in the planar waveguide to reach the following diffraction grating. This enables light extraction on the basis of a surface of large extent, especially as this effect is in addition to the free propagation of the light in the plane of the planar waveguide. The light distributing device according to the invention is thus able to collect the light from a narrow light beam, and distribute that light over at least one surface of large extent located outside the planar waveguide. One of the at least one surface preferably belongs to a sample to analyze, and preferably has a width greater than or equal to 1 mm (the width designating the greatest distance between two points on the surface considered, for example a diameter or an ellipse major axis). The light distribution is relatively even, since each grating participates in the light extraction.

The invention thus makes it possible to distribute light evenly over a large surface, this being with a device that is thin and easy to manufacture.

The extraction of light by diffraction gratings furthermore makes it possible to have control over an extraction angle of the light.

Advantageously, the extraction set is located in one of the two cladding layers.

The device may further comprise a support substrate, which is transparent over a range of wavelengths of use of the planar waveguide and which is superposed on the planar waveguide along an axis orthogonal to the plane of the planar waveguide. The support substrate may comprise a cavity, located on the opposite side to planar waveguide, and of which an extent in a plane parallel to the plane of the planar waveguide is greater than or equal to an extent of the extraction set in a plane parallel to the plane of the planar waveguide.

The diffraction gratings of the extraction set may extend in a series of strips that are parallel to each other, which each extend from one edge to the other of the extraction set. As a variant, they may be distributed over the two dimensions of a plane parallel to the plane of the planar waveguide.

Preferably, the device according to the invention is configured for, in use, distributing, over the scene to illuminate, light rays of which a wavelength spectrum is centered upon a wavelength named central wavelength, and the diffraction gratings of the extraction set all have a same average pitch value, with said average pitch value configured to extract from the planar waveguide, along an axis orthogonal to the plane of the planar waveguide, a light beam at the central wavelength propagating in the planar waveguide.

Advantageously, the extraction set is located in one of the two cladding layers, and in that the patterns of the diffraction gratings of the extraction set are each constituted by at least one full zone and at least one hollow zone, wherein the at least one full zone is constituted by the material of the cladding layer receiving the extraction set, and wherein the at least one hollow zone is able to be occupied by a surrounding medium.

The diffraction gratings of the extraction set may each be constituted by a plurality of patterns, with the patterns of said diffraction gratings extending along straight lines that are parallel to each other. As a variant, the diffraction gratings of the extraction set may each be constituted by a plurality of patterns, the patterns of said diffraction gratings extending along convex curved lines which each extend from one edge to the opposite edge of the planar waveguide.

Advantageously, the device according to the invention is configured for, in use, distributing, over the scene to illuminate, light rays of which a wavelength spectrum extends from a minimum wavelength to a maximum wavelength, and the planar waveguide is monomodal along an axis orthogonal to the plane of the planar waveguide and at said minimum wavelength.

The invention also covers an infrared imaging system which comprises:
  a light distributing device according to the invention, configured for, in use, distributing, over a scene to illuminate, light rays that come from an auxiliary light source; and
  a sensor module, comprising an infrared detector array configured to receive light rays sent back by the scene to illuminate;
the infrared detector array being located facing the extraction set, and on a same side as the planar waveguide receiving the extraction set, and
with a superposition ratio between the infrared detectors composing the infrared detector array, and the diffraction gratings of the extraction set, that is less than or equal to 50%.

The system may further comprise an infrared light source forming the auxiliary light source, and the light distributing device is configured for, in use, receiving at an entry light rays coming from said infrared light source and distributing these rays over the scene to illuminate, the entry of the light distributing device being formed by a transverse face of the planar waveguide.

The system may further comprise an imaging assembly comprising at least one refractive lens, disposed between the entry of the light distributing device and the infrared light source, and configured to receive at an entry the light emitted by the infrared light source and to provide at an exit a beam of light rays parallel to each other.

The system may further comprise a spacer member, attachedly mounted to the sensor module and provided with a bearing surface configured to come into contact with a sample to analyze and located at an opposite side of the spacer member to the sensor module, and the light distributing device forms all or part of the spacer member.

BRIEF DESCRIPTION OF THE DRAWINGS

The present invention will be better understood on reading the description of the example embodiments given purely by way of indication and which is in no way limiting, with reference to the accompanying drawings in which.

DESCRIPTION OF THE EMBODIMENTS

To facilitate reading, the Figures show the axes of an orthonormal frame of reference (Oxyz).

Throughout the text, the term "infrared" refers to a part of the light spectrum belonging to a spectral band from 0.78 μm to 50 μm, more preferably from 2 μm to 12 μm.

Throughout the text, a planar waveguide designates an optical guide member, suitable for guiding the propagation of light by successive reflections on planar faces that are parallel to each other. In a planar waveguide, the light is confined along one of the axis of three dimensional space, and is free to propagate along the other two axes of three dimensional space. A waveguide is constituted by a core, in which passes light, and a cladding, providing a desired difference in refractive index between the core and a medium surrounding the core. In the case of a planar waveguide, a core layer is interposed between two cladding layers, and the light is guided in the core layer by successive reflections at the interfaces between the core layer and each of the respective cladding layers (more particularly here, guiding is refractive). In practice the core layer is constituted by an optical part having a small dimension along one of the axes of three dimensional space (here the axis (Oz) of thickness) and large dimensions along each of the other two axes of the three dimensional space (here the axes (Ox) and (Oy) of length and width). Thus, light is confined along the (Oz) axis, and propagates freely along the axes (Oy) and (Ox). In the core layer, the ratio between the thickness and the length, and respectively the thickness and the width, is preferably greater than or equal to 5, or possibly greater than or equal to 10. The core layer is constituted by a material optically transparent to the wavelengths to propagate, for example with a transmission coefficient greater than or equal to 98% at said wavelengths. It advantageously has a same refractive index and a same composition throughout its volume.

Figure 1A:
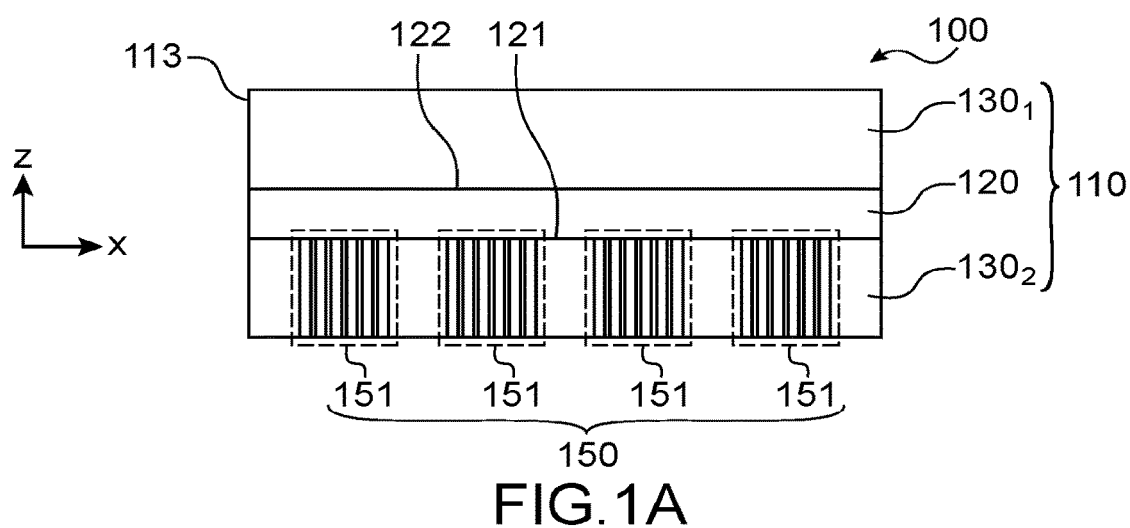
FIG. 1A is a diagram in cross-section view of a first embodiment of a light distributing device according to the invention.

A first embodiment of a device 100 for distributing light according to the invention is shown in FIG. 1A in a cross-section view on a plane (xOz).

The device 100 comprises a first layer cladding layer $130_1$, a core layer 120, and a second cladding layer $130_2$, which are superposed in that order along the axis (Oz) to form a planar waveguide 110. Each of these three layers is optically transparent to the wavelengths to propagate, for example with a transmission coefficient greater than or equal to 98% at said wavelengths. The wavelengths to propagate designates a range of wavelengths which the device is configured to receive then to distribute over a scene to illuminate.

The refractive index of the first cladding layer $130_1$ and the refractive index of the second cladding layer $130_2$ are each less than the refractive index of the core layer 120. The differences between the refractive index of the core layer and the refractive index of the first and respectively the second cladding layer, are configured to enable optical guiding of light in the core layer. Here, but without being limiting, the first cladding layer $130_1$ and the second $130_2$ are constituted by a same material. The core layer 120 is for example germanium (Ge), or a germanium-silicon (SiGe) alloy. The cladding layers $130_1$, $130_2$ are for example of a germanium-silicon (SiGe) alloy, with a higher silicon content than in the core layer. For example, the core layer is of germanium and the cladding layers of germanium-silicon alloy with 40% germanium atoms.

The core layer 120 is delimited, along the axis (Oz), by two faces 121, 122 parallel to the plane (xOy). These faces 121, 122 are the faces of greatest extent, or area, of the core layer 120. A plane of the planar waveguide 110 is defined as being a plane parallel to said faces 121, 122. Preferably, the largest outside faces of the planar waveguide 110 extend in planes that are parallel to the faces 121, 122. The core layer 120 and the first and respectively the second cladding layer $130_1$, $130_2$, are in direct physical contact with each other. The core layer 120 and the two cladding layers $130_1$, $130_2$ are superposed on each other, along an axis (Oz) orthogonal to the plane (xOy) of the planar waveguide, and with the core layer interposed between the two cladding layers $130_1$, $130_2$.

The planar waveguide 110 here has a rectangular parallelepiped shape with a square base. Preferably the length and the width (along the axis (Ox) and respectively (Oy)) of the planar waveguide 110 are each comprised between 5 mm and 20 mm, for example equal to 10 mm. The planar waveguide 110 may also comprise lateral claddings, in direct physical contact with the core layer 120 on the two opposite transverse faces of that layer. The lateral claddings are constituted by a material of refractive index less than that of the core layer, preferably the same material as that of the first and second cladding layers $130_1$, $130_2$.

The device 100 further comprises an extraction set 150, located in the planar waveguide 110, and constituted by a plurality of diffraction gratings 151. The diffraction gratings are distributed in the two dimensions of a plane (xOy). Preferably, they are evenly distributed in the plane (xOy).

In the example illustrated here, the extraction set 150 extends more particularly in one of the two cladding layers, here the second cladding layer $130_2$. In variants not shown, the extraction set extends in the core layer 120.

A diffraction grating designates a succession of patterns, distributed periodically or practically periodically (pitch variation less than or equal to 10% between two consecutive patterns). In the invention, each diffraction grating 151 is configured to deviate the light passing in the core layer 120, towards the exterior of the planar waveguide 110.

The diffraction gratings 151 are preferably all in a coplanar arrangement. Here, but without being limiting, each of the diffraction gratings 151 extends over the full thickness of the second cladding layer $130_2$. As a variant, each of the diffraction gratings 151 extends over only part of the thickness of the second cladding layer $130_2$. Whatever the case, the state forming the diffraction grating 151 preferably do not vary along the axis (Oz). Each pattern comprises a first portion constituted by the material of the second cladding layer $130_2$, and a second portion constituted by another material. The second portion may be full, constituted for example by ZnS, or be full, suitable for being occupied by a surrounding gaseous medium such as the air.

The diffraction gratings are advantageously distributed in a regular arrangement in a plane (xOy). Different examples of distribution are described below.

Figure 1B:
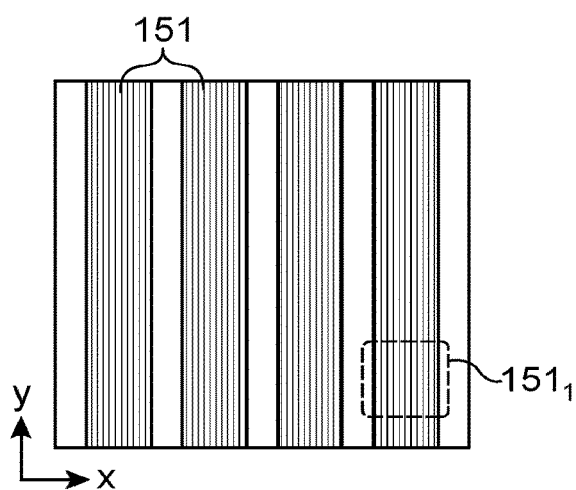
FIG. 1B.

FIG. 1B is a diagram of a first example of distribution of the diffraction gratings 151 in the planar waveguide. FIG. 1B is a diagram of an extraction set in a device according to the invention, in a top view with transparency. The diffraction gratings 151 extend here along lines that are parallel to each other, each going from one edge to the opposite edge of the planar waveguide. Here, the diffraction gratings 151 extend more particularly along lines parallel to the axis (Oy), and are distributed regularly along the axis (Ox).

Figure 1C:
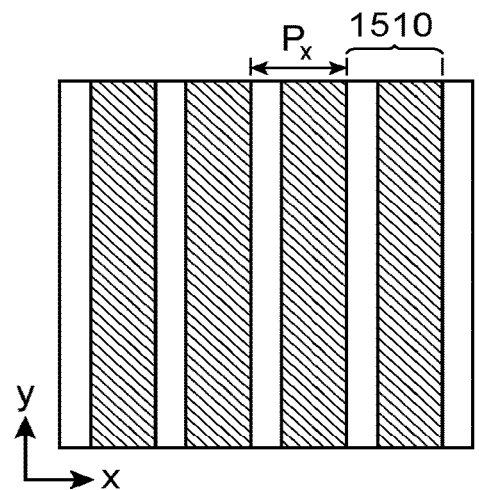
FIG. 1C.

FIG. 1C shows a detail view of one of the diffraction gratings 151 illustrated in FIG. 1B It is more particularly a detail view of the grating portion 151₁ marqueed in FIG. 1B. Each diffraction grating is a grating with one dimension, constituted by patterns 1510 which extend here in lines parallel to the axis (Oy). In each diffraction grating 151, a pitch for distribution of the patterns along the axis (Ox) is denoted P.

Figure 1D:
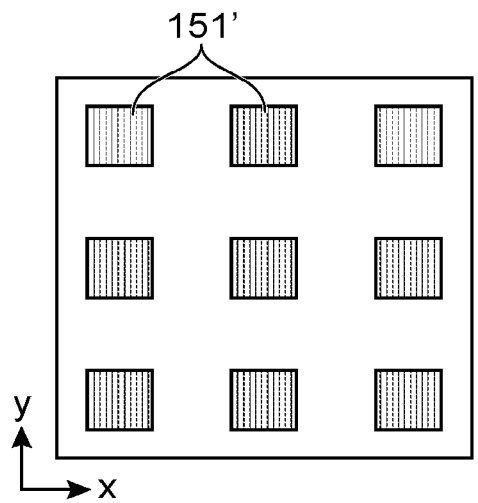
FIG. 1D.

FIG. 1D is a diagram of another example of distribution of the diffraction gratings 151' in the planar waveguide. In this variant, the diffraction gratings 151' are distributed in the two dimensions (Ox) and (Oy) of the plane of the planar waveguide. Here, the diffraction gratings are organized in rows and columns. The rows and columns respectively extend along the axis (Ox) and along the axis (Oy), with a same distribution pitch here along the axes (Ox) and (Oy). Each diffraction grating 151' here has a square section in a plane (xOy). As in the preceding example, each diffraction grating 151' is a grating with one dimension, here constituted by patterns which extend along lines parallel to the axis (Oy) (like the grating portion illustrated in FIG. 1C).

Figure 1E:
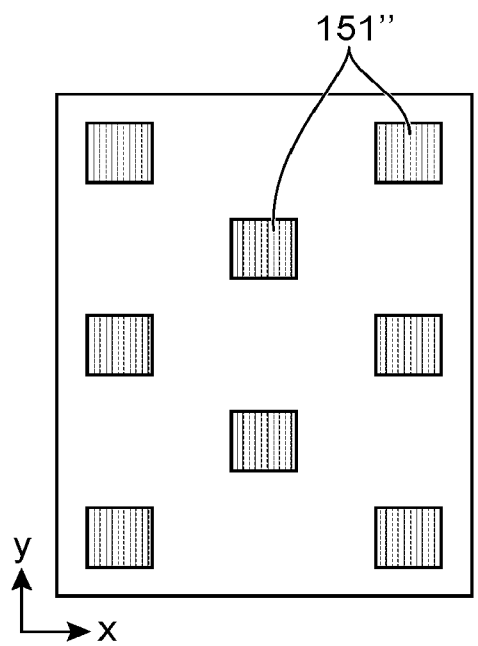
FIG. 1E are top view diagrams of different examples of distribution of the diffraction gratings of the extraction set, in a device according to the invention such as that of FIG. 1A.

FIG. 1E is a diagram of still another example of distribution of the diffraction gratings 151" in the planar waveguide. Here too, the diffraction gratings 151' are distributed in the two dimensions (Ox) and (Oy) of the plane of the planar waveguide. Here, the diffraction gratings 151" are distributed in a staggered, regular arrangement. Each diffraction grating 151" here has a square section in a plane (xOy). As in the preceding examples, each diffraction grating 151" is a grating with one dimension, here constituted by patterns which extend along lines parallel to the axis (Oy) (like the grating portion illustrated in FIG. 1C).

As illustrated later, with reference to FIG. 8A, the invention is not limited to a device with diffraction gratings of which the patterns extend in straight lines that are parallel to each other.

In operation, the device 100 is immersed in a surrounding medium that is gaseous or liquid, preferably air. The light arrives on the device 100, at the location of a transverse face thereof named entry face 113, and at the height of the core layer 120. The entry face 113 here extends in a plane parallel to the plane (yOz). Inside the planar waveguide 110, the light propagates in the core layer 120 by successive reflections at the interfaces between the core layer 120 and each of the cladding layers 130₁ and 130₂. Here, the light propagates in the planar waveguide along the axis (Ox). If the light beam introduced into the planar waveguide 110 is narrower than the latter, the light propagates in the planar waveguide 110 while spreading along the axis (Oy). The light is extracted from the planar waveguide 110, at the extraction set 150. Preferably, each of the diffraction gratings of the extraction set participates in this light extraction. With the exception of a series of gratings located on the opposite side to the entry face 113, each of the diffraction gratings extracts only part of the light reaching it. Thus, the non extracted light continues to propagate in the planar waveguide until it reaches a neighboring diffraction grating, which in turn carries out the extraction of at least part of the light reaching it. The light is thus extracted to the outside of the planar waveguide 110, and distributed over an extended surface greater than or equal to that of the extraction set 150.

Figure 2:
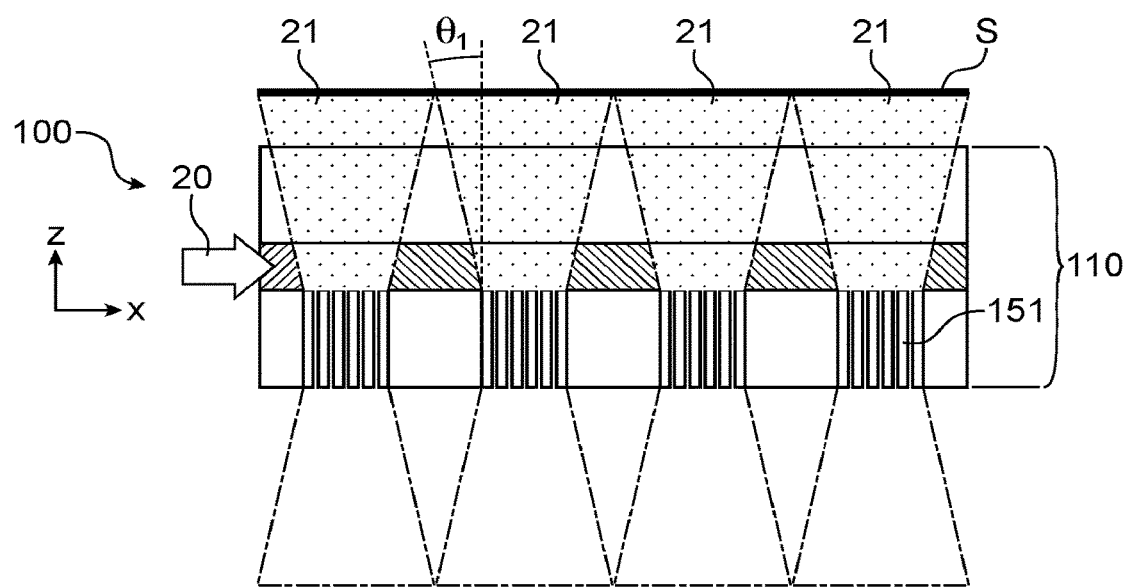
FIG. 2 is a diagram of the embodiment of FIG. 1A, in use.

FIG. 2 is a diagram of the device 100, in use. The arrow 20 represents the light beam introduced at an entry of the planar waveguide 110. The beams 21 represent the light beams extracted at each of the diffraction gratings 151, towards a scene to illuminate S. The scene to illuminate S here extends facing the extraction set, in a plane (xOy). The scene to illuminate S is represented here spaced from the device 100 according to the invention. In practice, it is instead juxtaposed against an outside face of the device 100 according to the invention. The scene to illuminate S for example has a width comprised between 1 mm and 15 mm. The scene to illuminate 20 for example has a width comprised between 1 mm and 15 mm (greatest distance between two points). It is for example a square with 3 mm sides. Whatever the case, the dimensions of the scene to illuminate are substantially equal to the dimensions of the extraction set.

Each of the diffraction gratings of the extraction set extracts light from out of the plane of the planar waveguide, in the form of a diverging beam. It is thus possible to distribute the light over the scene to illuminate, without any area of shadow, and using diffraction gratings spaced apart from each other. The greater the (solid) angle of divergence of the light beams, the more the diffraction gratings can be spaced apart from each other.

In the planar waveguide, an angle between an outside face of the planar waveguide at the location of which light emerges, and a light ray deviated by diffraction grating, must remain less than a critical threshold beyond which the deviated light is reflected inside the device according to the invention. Here, the light is extracted in light beams each aligned with the normal to the plane of the planar waveguide, with a divergence half-angle $\Theta_1$ (wherein the divergence half-angle designates half the total angle of divergence). $\Theta_1$ must therefore remain less than said critical threshold. It is assumed that the outside face of the planar waveguide at the location of which the light emerges is parallel to the plane of the planar waveguide, which is generally the case. Preferably, the diffraction gratings are configured such that the divergence half-angle is equal to, or only slightly less than, the critical threshold. The divergence of the gratings is thus maximized which makes it possible to space them apart as much as possible, and thereby limit a number of infrared detectors blinded in the system described below.

Each diffraction grating of the extraction set deviates light in two opposite directions: towards the scene to illuminate S and in the opposite direction. Here, the scene to illuminate is to be found on the opposite side of the planar waveguide to the extraction set. As detailed below (see description of FIG. 6), it is possible to favor one of these two directions, such that the major part of the extracted light arrives on the scene to illuminate. In addition or as a variant, it is possible to block the rays emitted in the opposite direction, for example using an absorbent or reflective structured layer juxtaposed against the extraction set. Said structured layer comprises full zones and open zones, such that each diffraction grating is covered with an absorbent or reflective full zone on the on the opposite side to the scene to illuminate. Between the diffraction gratings, the open zones enable light to pass, in particular light back-scattered by the scene to illuminate.

Each diffraction grating may have a constant pitch value for distribution of the patterns over the whole extent of the diffraction grating. As a variant, at least one of the diffraction gratings may have a variable value of the distribution pitch of the patterns, in order to increase a divergence angle of the extracted light. Advantageously, all the gratings of the extraction set are configured to extract the light with a same divergence angle. In all cases, it is possible to define an average value of the distribution pitch of the patterns. When the pitch is constant, this average value is equal to the distribution pitch of the patterns. When the pitch is variable, this average value is equal to the arithmetic mean of the values taken by the distribution pitch of the patterns.

Preferably, the diffraction gratings of the extraction set all have a same average value of the distribution pitch of the patterns. This average value of the distribution pitch of the patterns, or average pitch value, is configured such that the light extract by the corresponding grating forms a light beam centered on an axis orthogonal to the plane of the planar waveguide. For this, the average pitch value is configured such that the light at a central wavelength is deviated along an axis orthogonal to the plane of the planar waveguide. The central wavelength designates the central value of a range of wavelengths which the device according to the invention is configured to receive passing within the planar waveguide then to extract towards a scene to illuminate via the extraction set. This range of wavelengths is named wavelength range of use. The average value of the pitch making it possible to verify that the above condition is determined, in known manner, using the grating equation and considering the refraction orders 1 and −1.

Preferably the planar waveguide 110 is monomodal along the axis (Oz), and over the whole wavelength range of use. In order for this condition to be verified over the whole of said wavelengths range, that suffices for it to be verified for the smallest value of that range. This condition sets a maximum value for the thickness of the core layer, for example 1.6 μm. To limit losses at the longest wavelengths, the thickness of the core layer is preferably chosen as close as possible to that maximum value.

Figure 3:
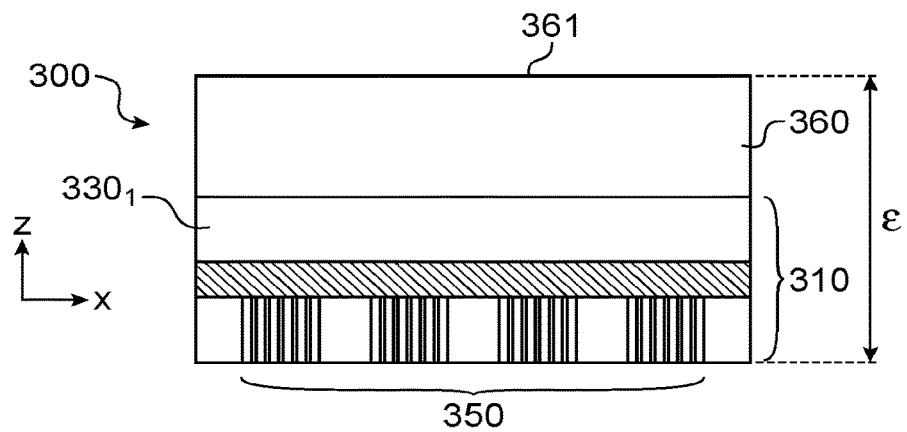
FIG. 3 is a diagram in cross-section view of a second embodiment of a light distributing device according to the invention.

FIG. 3 is a diagram in cross-section view of a second embodiment of a light distributing device 300 according to the invention. The device 300 only differs from the first embodiment in that it further comprises a support substrate 360, superposed with the planar waveguide along the axis (Oz), on the opposite side to the extraction set 350. The support substrate 360 extends in a plane (xOy). Here, the support substrate 360 is juxtaposed against the planar waveguide 310, in direct physical contact with the latter at the location of the first cladding layer $330_1$.

In an orthogonal projection of the device 300 in a plane parallel to the plane (xOy), the projected form of the extraction set 350 is located within the projected form of the support substrate 360. Stated otherwise, the support substrate 360 entirely covers the extraction set 350.

The support substrate 360 is transparent over the wavelength range of use. It preferably has a refractive index less than that of the first cladding layer $330_1$. The support substrate 360 is preferably constituted by silicon. It in particular makes it possible to provide good mechanical strength properties for the planar waveguide 310. With this support substrate 360, the thickness E (along the axis (Oz)) of the device 300 is preferably comprised between 100 μm and 1.5 mm, preferably between 100 μm and 1.0 mm, and is for example equal to 725 μm. The thickness of the support substrate is preferably greater than or equal to 200 μm.

Here the greatest index jump is to be found at the interface between the support substrate 360 and the surrounding medium. The critical threshold as described above, beyond which the light deviated by the diffraction grating is reflected within the device according to the invention, thus depends on the refractive indexes in the support substrate 360 and in the surrounding medium. For a support substrate 360 of silicon, in a surrounding medium constituted by air, the critical threshold amounts to approximately 17° in absolute value.

One face of the support substrate 360, located on the opposite side of the substrate to the planar waveguide, forms a bearing surface 361 for a sample to observe. In use, the bearing surface 361 is positioned against the sample. The scene to observe is formed by a surface of the sample in contact with the bearing face 361, located facing the extraction set 350.

Figure 4:
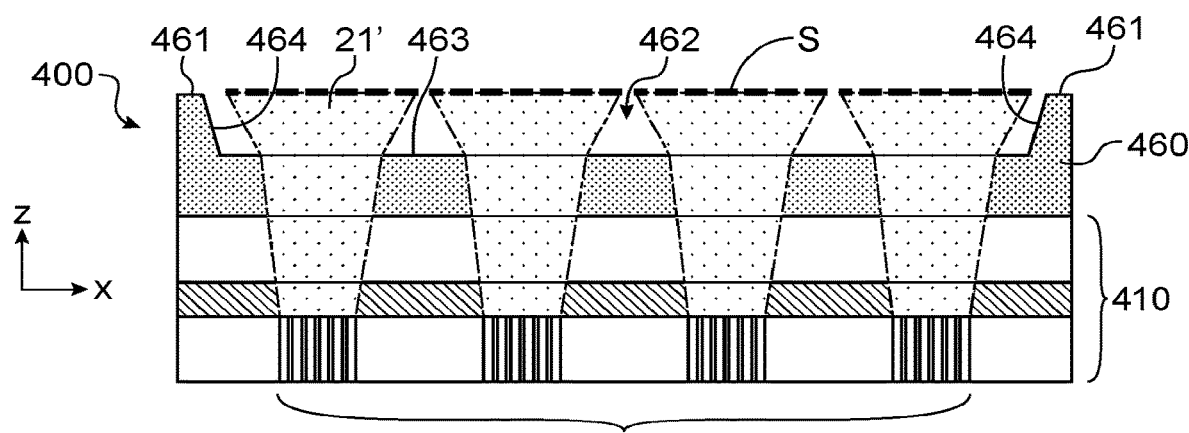
FIG. 4 is a diagram in cross-section view of a third embodiment of a light distributing device according to the invention.

FIG. 4 is a diagram in cross-section view of a third embodiment of a light distributing device 400 according to the invention. The device 400 only differs from the device of FIG. 3 in that the support substrate 460 comprises a cavity 462, open on the opposite side to the planar waveguide 410. The cavity 462 comprises a bottom 463, which here extends in a plane (xOy), and lateral faces 464. The depth of the open cavity 462, measured along the axis (Oz), is comprised for example between 100 μm and 400 μm.

In an orthogonal projection of the device 400 in a plane parallel to the plane (xOy), the projected form of the extraction set 450 is located within the projected form of the cavity 462. Stated otherwise, the cavity 462 entirely covers the extraction set 450.

The support substrate 460 extends laterally beyond the cavity 462, in all directions of a plane (xOy). One face of the support substrate 460, located on the opposite side of the substrate to the planar waveguide and around the cavity 462, forms the bearing surface 461 for a sample to observe. In use, the bearing surface 461 is positioned against the sample and the scene to observe S is formed by a surface of the sample located facing the extraction set 450 and the cavity 462.

This embodiment makes it possible to insert an interposing layer between the scene to observe and the support substrate 460, formed by the material of the surrounding medium in the cavity 462 (preferably air). As the refractive index of the surrounding medium is less than the refractive index of the support substrate 460, the divergence of the extracted light beams greatly increases when the light enters the cavity 462 (see beams 21'). This increase in divergence in particular makes it possible to reduce the thickness of the device according to the invention while keeping its other characteristics unchanged. In addition or as a variant, it makes it possible to reduce the number of diffraction gratings in the extraction set, which reduces the number of blinded infrared detectors in the system illustrated below.

An advantageous feature of the extraction set of the device according to the invention is described next. As explained above, in operation, each of the diffraction gratings of the extraction set only extracts part of the light reaching it, and the light not extracted by said grating continues to propagate in the planar waveguide to reach a neighboring grating. Therefore, if all the diffraction gratings of the extraction set have a same light extraction rate, they will extract increasingly less light as the light propagates along the extraction set. As a matter of fact, the gratings reached first by the light passing in the planar waveguide will extract a percentage Pc of a large amount of light, while the gratings reached last will extract the same percentage Pc but from a residual amount of light. It is thus advantageous for the extraction set to have a variable extraction rate, from one diffraction grating to another, so as to provide a good level of uniformity in the light distribution over the scene to illuminate. The extraction rate of the diffraction gratings advantageously varies by increasing monotonically, along lines parallel to an axis of propagation of the light in the planar waveguide, from an entry face of the light in the planar waveguide. The variation may include plateaus, or increase strictly.

The extraction rate of a diffraction grating is a function of the average value of its fill factor, here a ratio between the total volume occupied by the material of lowest index and the total volume of the diffraction grating. All the diffraction gratings advantageously have a same depth (dimension along the axis (Oz). The fill factor defined above thus simplifies to a ratio of areas. When the pitch is constant, the average value of the fill factor may be calculated on a single unit, or pattern, of the grating. The extraction is all the greater as the fill factor approaches 50% (highest index modulation). Preferably, the average value of the fill factor does not exceed 0.5 (50%) in any of the diffraction gratings of the extraction set. In this case, the higher the fill factor, the higher is the extraction rate, and vice-versa.

Figure 5:
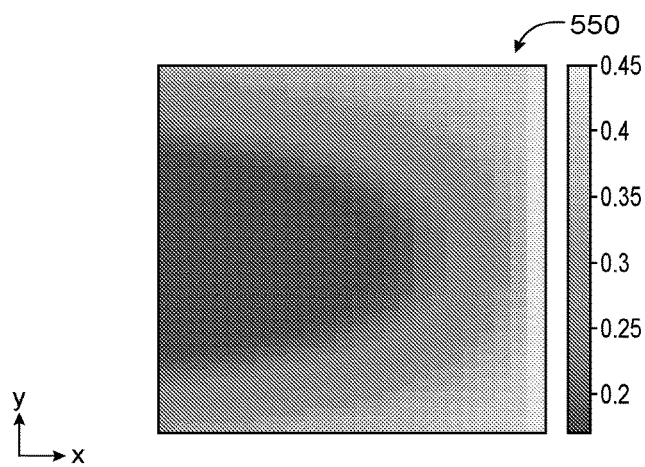
FIG. 5 is a diagram of a fourth embodiment of a light distributing device according to the invention.

FIG. 5 is a top view diagram of distribution of the fill factors in the diffraction gratings of an extraction set 550 of a device according to a fourth embodiment of the invention. The value of the fill factor in a diffraction grating is represented by a grayscale value (scale on the right).

All the diffraction gratings of the extraction set have a same depth (dimension along the axis (Oz). The distribution of the fill factors varies monotonically along lines parallel to the axis (Ox), here by increasing from an entry face to an exit face of the planar waveguide. Here, the distribution of the fill factors is configured to a case in which the light propagates in the planar waveguide in the form of a plane wave. The corresponding optical power follows a normal distribution as a function of the position along the axis (Oy). The fill factor of the diffraction gratings thus follows this normal distribution. Diffraction gratings thus have a fill factor that increases along lines parallel to the axis (Ox), and with a constant fill factor along convex curved lines. Throughout the text, the term "convex" here designates lines bowed in an opposite direction to the entry face of the device according to the invention.

The extraction rate of a diffraction grating is also a function of the depth of that grating, here along the axis (Oz). Thus, according to a variant not shown, the diffraction gratings of the extraction set have a depth that varies monotonically along lines parallel to the axis of propagation of light in the planar waveguide.

The extraction rate of a diffraction grating is also a function of the dimension of that grating along an axis of propagation of light in the planar waveguide. Thus, according to a variant not shown, the diffraction gratings of the extraction set each have an extent that varies along lines parallel to the axis of propagation of light in the planar waveguide.

It is possible to combine at least two of the three parameters mentioned above to vary an extraction rate in the diffraction gratings of the extraction set.

In each of the embodiments and variants of the invention, the fill factor may be slightly variable within a same diffraction grating, to give symmetry to the far-field radiation. In this case a variation of the average value of the fill factor is considered, from one grating to the next of the extraction set.

The invention provides a solution to distribute light over a scene to illuminate, preferably with light that is normal or practically normal. Advantageously, the scene to illuminate is parallel to the planar waveguide, and the light emerges therefrom in a plurality of elementary beams each oriented along an axis normal to the planar waveguide, each with a divergence angle of approximately 17°. The device according to the invention has low losses, as well as good retention of flux (in particular compared with a light distributing device based on optic fibers). It is also highly compact, in particular having a small thickness enabling it to serve as a spacer between the sample and the sensor module in the lens-free optical imaging system described in the introduction.

Figure 6:
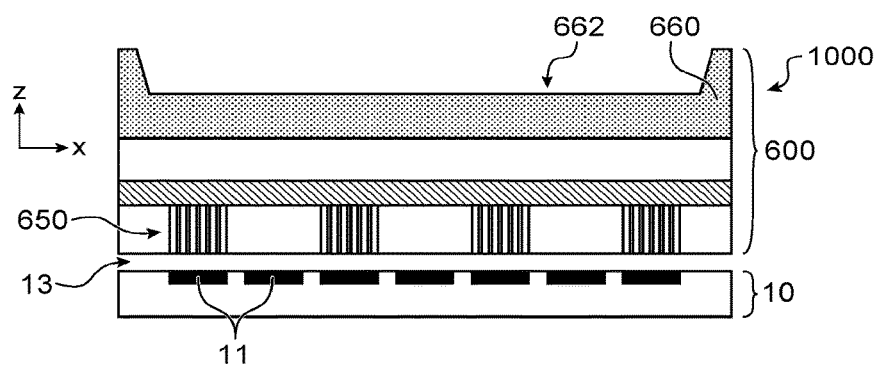
FIG. 6 is a diagram in cross-section view of a first embodiment of an infrared imaging system according to the invention.

FIG. 6 is a diagram in cross-section view of a first embodiment of an infrared imaging system 1000 according to the invention; The system 1000 here comprises a light distributing device 600, and a sensor module 10 (or imaging module). The device 600 is identical here to that of FIG. 4.

The sensor module 10 comprises an infrared detector array, composed of infrared sensors 11 sensitive at infrared wavelengths, and more particularly over a wavelength range of use. It is for example a photodiode array with semiconductors or a bolometer array. The infrared detector array extends over a square or rectangular area, with sides preferably comprised between 1 mm and 10 mm. It extends here in a plane (xOy). The sensor module 10 may further comprise an electronic circuit, not shown, for reading electrical signals supplied by the infrared detector array. The infrared detector array extends facing the extraction set 650 of the light distributing device 600, on the same side as the planar waveguide receiving the extraction set (and thus on the opposite side to the cavity 662 formed in the support substrate 660).

In use, the light is distributed over the scene to illuminate by the light distributing device 600. The scene to illuminate sends back part of the light received, by back-scatter. The back-scattered light passes through the light distributing device 600 to reach the sensor module 10, in which the infrared detector array acquires an image of the light back-scattered by the scene to illuminate.

The light distributing device 600 and the sensor module 10 are not in direct physical contact with each other, but are separated from each other by a low-index interposing layer 13, in particular a layer of air. The low-index interposing layer 13 has a refractive index strictly less than that of the support substrate 660, making it possible to promote extraction towards the scene to illuminate rather than in the opposite direction. As detailed above, an absorbent or reflective structured layer, as described above, may furthermore be juxtaposed against the extraction set.

Despite this, the infrared sensors 11 located directly opposite a diffraction grating of the extraction set may be dazzled by the light directly extracted towards the sensor module, and thus be blinded and inoperative. It is thus advantageous to maximize the divergence of the light beams sent back by each of the diffraction gratings, to maximize spacing between the diffraction gratings, and thus minimize a number of blinded infrared sensors. As detailed above, this divergence may be increased using a grating pitch that is variable within a same diffraction grating, and/or using a cavity such as described with reference to FIG. 4. The divergence half-angle must nevertheless remain less than or equal to a critical threshold as mentioned above. Furthermore, the distribution of the diffraction gratings in the two dimensions of the plane (xOy) is more advantageous than the distribution in parallel strips, since it makes it possible to mask fewer infrared sensors.

Preferably, a superposition ratio between the infrared detectors 11 of the sensor module and the diffraction gratings of the extraction set 650 is less than or equal to 50%. More preferably, at least half of the infrared detectors 11 are not covered, even partially, by at least part of a diffraction grating of the extraction set. When the diffraction gratings are distributed in the two dimensions of the plane (xOy), there are preferably at least twice as many infrared sensors as diffraction gratings.

Figure 7A:
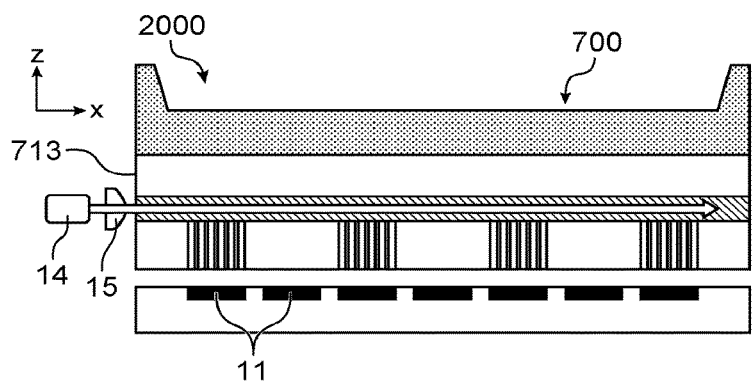
FIG. 7A.

FIG. 7A illustrates a second embodiment of an infrared imaging system 2000 according to the invention. This system differs from that of FIG. 6 only in that it further comprises an infrared light source 14, as well as refractive optics 15.

The infrared light source 14 is configured to emit at least one light beam at an infrared wavelength. The light emitted by the infrared light source 14 has a wavelength spectrum that extends over a wavelengths rage of use as mentioned above. The light source 14 may comprise one or more elementary sources, from among at least one laser source (such as a quantum cascade laser (QCL), an interband cascade laser (ICL), an internal- or external-cavity laser), at least one LED, at least one black body source, etc. The infrared light source 14 may comprise a magnifying member such as an auxiliary planar waveguide, to transform a narrow light beam into a light beam of a same width as that of the light distributing device.

Figure 7B:
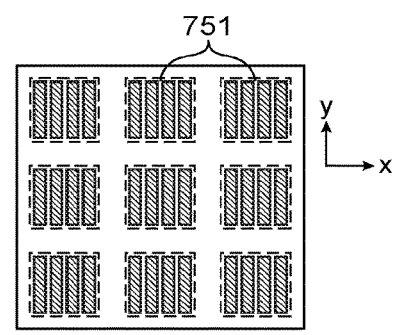
FIG. 7B are diagrams of a second embodiment of an infrared imaging system according to the invention.

The refractive optics 15 are interposed between the light source 14 and the entry face 713 of the light distributing device 700. It is configured to receive at an entry a light beam coming from the light source 14, and to provide at an exit a collimated light beam that then propagates to reach the entry face 713 of the device 700, at the height of the core layer. The light wave propagating in the planar waveguide of the device 700 thus has a planar wave front. The diffraction gratings 751 forming the extraction set are each constituted by a plurality of patterns, which extend along lines parallel to the wave front, here lines parallel to the axis (Oy) (see FIG. 7B).

Figure 8A:
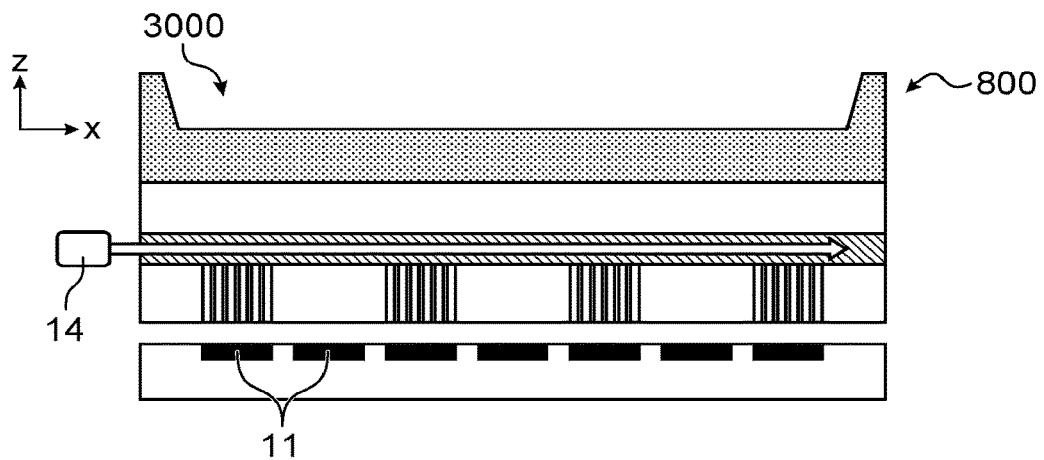
FIG. 8A.
Figure 8B:
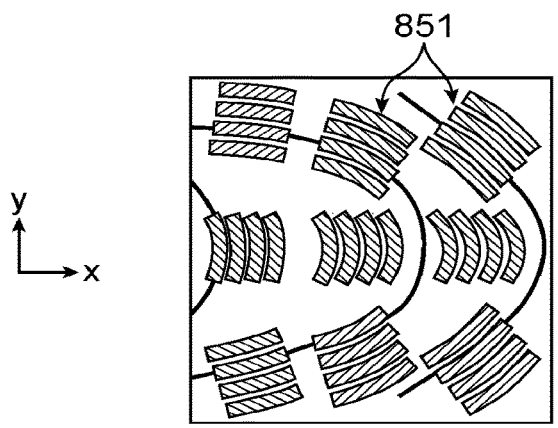
FIG. 8B are diagrams of a third embodiment of an infrared imaging system according to the invention.

FIG. 8A illustrates a third embodiment of an infrared imaging system 3000 according to the invention. This system only differs from that of FIG. 7A in that the infrared light source 14 is disposed directly at an entry of the light distributing device 800, without refractive optics between the two. The light beam propagating in the planar waveguide of the device 800 is thus a divergent beam, with a convexly curved wave front. Each diffraction grating 851 is thus constituted by a plurality of patterns which then extend along lines parallel to the wave front reaching said grating. These lines are convex lines, which each extend from one edge to the opposite edge of the extraction set (see FIG. 8B).

Whatever the case, in each diffraction grating, the patterns of the grating extend preferably in lines which are perpendicular at all points to a light ray propagating in the planar waveguide in a central zone of said grating.

Figure 9:
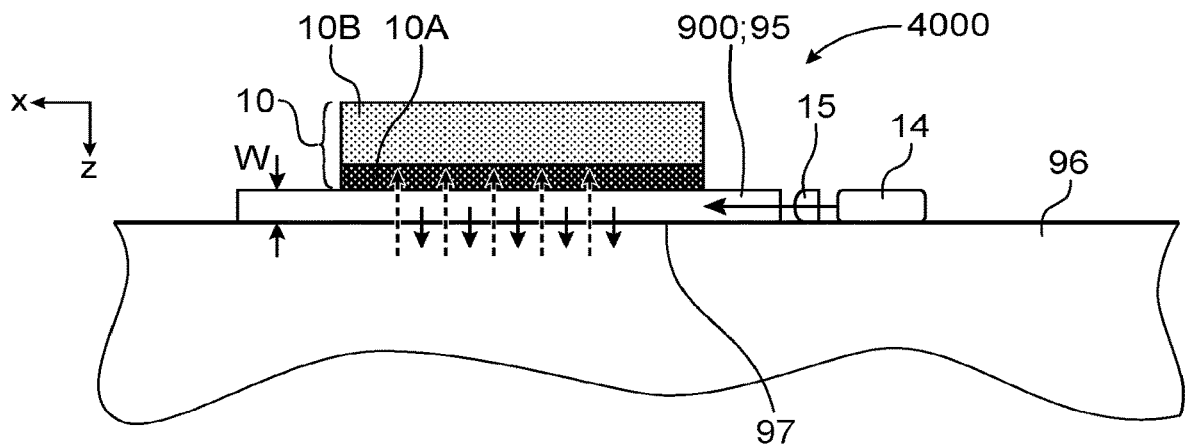
FIG. 9 is a diagram of an infrared imaging system according to the invention, in use.

FIG. 9 is a diagram of an infrared imaging system 4000 according to the invention, in use. The infrared imaging system 4000 is of the same type as that of FIG. 7A, with the light distributing device 900 according to the invention, receiving the light of an infrared light source 14 with refractive optics 15 between them. The light is distributed over a scene to illuminate belonging here to a sample 96.

In FIG. 9, there has intentionally been shown the infrared detector array 10A and the reading circuit 1013 together forming the sensor module 10.

The infrared imaging system 4000 here comprises a spacer member 95, or spacer, attachedly mounted to the sensor module 10 on the same side as the infrared detector array 10A.

The spacer member 95 comprises a bearing surface 97, on the opposite side to the sensor module 10. The bearing surface 97 here extends in a plane parallel to the plane (xOy), parallel to the plane of the infrared detector array 10A. The spacer member 95 has a thickness W, measured along the axis (Oz). In operation, the bearing surface 97 is pressed against the sample 96. A region of the sample 96 located facing the infrared detector array 10A forms the scene to illuminate. The spacer member 95 ensures a predetermined fixed distance between the scene to illuminate and the infrared detector array 10A, named working distance. The working distance is preferably comprised between 100 µm and 1.5 mm. The infrared light source 14 is located here on the spacer member 95, on the opposite side to the bearing surface 97. The light distributing device 900 here is combined with the spacer member 95.

In variants not shown, the light distributing device 900 only forms part of the spacer member 95. For example, the spacer member 95 may be formed by the superposition of the light distributing device 900 and an additional shim. Whatever the case, the small thickness of the light distributing device according to the invention, advantageously comprised between 100 µm and 1.5 mm, enables it to form all or part of the spacer member 95.

It can be considered that the sensor module 10 and the light distributing device 900 together form a lens-free imaging system, able to acquire an image from the scene to illuminate, without refractive image-forming optics (except possibly an array of microlenses upstream of the infrared detector array 10A). The images obtained are wide-field images, by reflection.

The infrared imaging system 4000 is advantageously formed in a photonic chip. An infrared imaging system has for example been formed according to the invention, with the following features:
  light wavelengths range to distribute over the scene to illuminate: from 5.9 µm to 8.1 µm;
  core layer of Ge, of thickness configured such that the planar waveguide is monomodal along the axis (Oz) throughout the wavelength range considered, i.e. a thickness of 1.6 µm;
  extraction set that extends over an area of 2.72 mm*2.72 mm;
  cladding layers of SiGe, of thickness 3 µm;
  infrared detector array formed from an array of bolometers with 80*80 micro-sensors, each of a square shape with 25 µm sides, and distributed with a distribution pitch of 34 µm, i.e. an active zone of 3.28 mm*3.28 mm (of slightly greater extent than the extraction set);
  the diffraction gratings of the extraction set have a length of 34 µm, extend in parallel strips as in FIG. 1B, and are aligned with some of the infrared sensors of the infrared detector array;
  the pitch of the diffraction gratings is configured to obtain a zero extraction angle at the median value of the wavelength range considered (7 µm), here equal to 1.81 µm;
  the depth of the gratings is 2.5 µm.

It can thus be shown that a support substrate of thickness 300 µm and an open cavity of depth 250 µm provide a good compromise between number of blinded micro-sensors and compactness.

In a second configuration which differs only in that the diffraction gratings are distributed along the axis (Ox) and (Oy), only ⅛ of the micro-sensors are blinded.

The light distributing device according to the invention is advantageously formed from a crystalline silicon substrate, which may be thinned to obtain the desired working distance. The planar waveguide is obtained by successive epitaxy operations, to successively form the first cladding layer, the core layer and the second cladding layer. The set is polished, on the opposite side to the silicon substrate, then the diffraction gratings are etched in the second cladding layer by anisotropic partial etching. The set obtained may then be turned over undergo anisotropic partial etching on the back face, to form a cavity in the silicon substrate.

The invention thus relates to a device forming a passive extraction structure, advantageously coupled with one or more quantum cascade lasers, and for a use at very short working distance. The device according to the invention preferably has an entry pupil smaller than the exit pupil. The invention makes it possible to distribute the light of an infrared light beam, preferably belonging to the spectral range from 2 μm to 12 μm. It finds an application in particular in the field of multi-spectral active imaging and hyperspectral active imaging, to obtain biochemical information easily and rapidly. It is possible in particular to determine the chemical composition of a sample from its infrared light absorption signature.

The invention is not limited to the examples detailed above, and numerous other examples may be implemented without departing from the scope of the invention. For example, the extraction set may be located in the first cladding layer, on the same side as the scene to illuminate, or in the core layer of the planar waveguide. The gratings of the extraction set may extend over all or part of the thickness of the core layer, and respectively the first cladding layer. If they are formed in the core layer, they are advantageously constituted by portions of material of the core layer and portions of material of the first and respectively second cladding layer. The invention is also not limited to diffraction gratings with one dimension, and also covers devices in which the extraction set comprises or is constituted by a diffraction grating or gratings with two dimensions. A diffraction grating with two dimensions preferably takes the form of a array of studs. Similarly, the invention is not limited to the examples of materials cited. For example, the support substrate may be constituted by any material having at least one window transparent to infrared and a refractive index less than that of the cladding layers. Similarly, the examples of systems detailed above may be combined with each of the embodiments and variants of light distributing devices according to the invention. According to other variants, the planar waveguide may comprise a region of spatial spreading, upstream of an extraction region, with the region of spatial spreading configured to perform spatial spreading of the light and with an extraction region which receives the extraction set. A grayscale diaphragm may be disposed upstream of the light distributing device according to the invention, to provide evenness for the lighting on the scene to illuminate.

The invention claimed is:

1. A light distributing device configured for, in use, distributing, over a scene to illuminate light rays coming from an auxiliary light source, comprising:
a planar waveguide which comprises two cladding layers and one core layer, with two faces of greater extent of the core layer which extend parallel to a plane named plane of the planar waveguide, and with the two cladding layers and the core layer being superposed together along an axis orthogonal to the plane of the planar waveguide with the core layer disposed between the two cladding layers; and
an extraction set, located in the planar waveguide, and constituted by a plurality of diffraction gratings distributed in the two dimensions of a plane parallel to the plane of the planar waveguide, the extraction set being located in one of the two cladding layers, and in that the patterns of the diffraction gratings of the extraction set are each constituted by at least one full zone and at least one hollow zone, wherein the at least one full zone is constituted by the material of the cladding layer receiving the extraction set, and wherein the at least one hollow zone is able to be occupied by a surrounding medium,
wherein an average value of a fill factor varies monotonically, from one diffraction grating to another of the extraction set, and along an axis parallel to the plane of the planar waveguide.

2. The device according to claim 1, wherein it further comprises a support substrate, which is transparent over a range of wavelengths of use of the planar waveguide and which is superposed on the planar waveguide along an axis orthogonal to the plane of the planar waveguide.

3. The device according to claim 2, wherein the support substrate comprises a cavity, located on the opposite side to planar waveguide, and of which an extent in a plane parallel to the plane of the planar waveguide is greater than or equal to an extent of the extraction set in a plane parallel to the plane of the planar waveguide.

4. The device according to claim 1, wherein the diffraction gratings of the extraction set extend in a series of strips that are parallel to each other, which each extend from one edge to the other of the extraction set.

5. The device according to claim 1, wherein the diffraction gratings of the extraction set are distributed in the two dimensions of a plane parallel to the plane of the planar waveguide.

6. The device according to claim 1, wherein it is configured for, in use, distributing, over a scene to illuminate light rays of which a wavelength spectrum is centered on a wavelength named central wavelength, and in that the diffraction gratings of the extraction set all have a same average value of a pitch, said average value of the pitch being configured to extract from the planar waveguide, along an axis orthogonal to the plane of the planar waveguide, a light beam at the central wavelength propagating in the planar waveguide.

7. The device according to claim 1, wherein the diffraction gratings of the extraction set are each constituted by a plurality of patterns, and in that the patterns of said diffraction gratings extend along straight lines that are parallel to each other.

8. The device according to claim 1, wherein the diffraction gratings of the extraction set are each constituted by a plurality of patterns, and in that the patterns of said diffraction gratings extending along convex curved lines which each extend from one edge to the opposite edge of the planar waveguide.

9. The device according to claim 1, wherein it is configured for, in use, distributing, over the scene to illuminate light rays of which a wavelength spectrum extends from a minimum wavelength to a maximum wavelength, and in that the planar waveguide is monomodal along an axis orthogonal to the plane of the planar waveguide and at said minimum wavelength.

10. An infrared imaging system (which comprises:
a light distributing device according to claim 1, configured for, in use, distributing, over a scene to illuminate, light rays that come from an auxiliary light source; and
a sensor module, comprising an infrared detector array configured to receive light rays sent back by the scene to illuminate;
the infrared detector array being located facing the extraction set, and on a same side as the planar waveguide receiving the extraction set, and with a superposition ratio between the infrared detectors of the infrared detector array, and the diffraction gratings of the extraction set, that is less than or equal to 50%.

11. The system according to claim 10, which further comprises an infrared light source forming the auxiliary light source, and wherein the light distributing device is configured for, in use, receiving at an entry light rays coming from said infrared light source and distributing these rays over the scene to illuminate, the entry of the light distributing device being formed by a transverse face of the planar waveguide.

12. The system according to claim 11, which further comprises an imaging assembly comprising at least one refractive lens, disposed between the entry of the light distributing device and the infrared light source, and configured to receive at an entry the light emitted by the infrared light source and to provide at an exit a beam of light rays parallel to each other.

13. The system according to claim 10, wherein it further comprises a spacer member, attachedly mounted to the sensor module and provided with a bearing surface configured to come into contact with a sample to analyze and located at an opposite side of the spacer member to the sensor module, and in that the light distributing device forms all or part of the spacer member.

* * * * *